US012789873B1

(12) United States Patent
Bolton

(10) Patent No.: US 12,789,873 B1
(45) Date of Patent: Nov. 10, 2026

(54) SECURITY CART

(71) Applicant: John Darcy Bolton, Irvine, CA (US)

(72) Inventor: John Darcy Bolton, Irvine, CA (US)

( * ) Notice: Subject to any disclaimer, the term of this patent is extended or adjusted under 35 U.S.C. 154(b) by 0 days.

(21) Appl. No.: 19/010,286

(22) Filed: Jan. 6, 2025

Related U.S. Application Data

(60) Provisional application No. 63/718,629, filed on Nov. 9, 2024.

(51) Int. Cl.
*B62B 3/00* (2006.01)
*B62B 5/00* (2006.01)
*B62B 5/04* (2006.01)

(52) U.S. Cl.
CPC ............ *B62B 3/005* (2013.01); *B62B 5/0013* (2013.01); *B62B 5/0414* (2013.01); *B62B 5/0447* (2013.01)

(58) Field of Classification Search
CPC ........... B62B 3/005; B62B 3/00; B62B 3/001; B62B 3/002; B62B 3/004; B62B 3/02; B62B 5/0013; B62B 5/0414; B62B 5/0447; B62B 5/0053; B62B 5/0069; B62B 5/04; B62B 5/0404; B62B 5/0438; B62B 5/0442; B62B 5/0457; B62B 5/0461; B62B 5/06; B62B 2005/0471
See application file for complete search history.

(56) References Cited

U.S. PATENT DOCUMENTS 5,765,842 A * 6/1998 Phaneuf .................. B62B 3/001 280/47.35
6,000,486 A * 12/1999 Romick ................. B62D 51/04 180/209
6,264,219 B1 * 7/2001 Smith ................... B62B 5/0006 280/47.35
8,371,404 B2 * 2/2013 Boeckler ................... E04H 4/14 180/65.1
9,108,657 B2 * 8/2015 Hussain ................ B62B 5/0414
9,205,746 B2 * 12/2015 Sekine .................... B60L 50/52
9,367,061 B2 * 6/2016 Miller .............. G10K 11/17873
9,808,545 B2 * 11/2017 Mauzerall .............. A47B 57/20
10,278,877 B2 * 5/2019 Wilson .................... B62B 3/003
10,389,121 B1 * 8/2019 Sherry ...................... H02J 3/02
10,988,158 B2 * 4/2021 Basco de Rosa Payne ................ B62B 5/0433
11,464,328 B2 * 10/2022 Mascaretti ......... B64D 11/0007
(Continued)

*Primary Examiner* — James M Dolak

(74) *Attorney, Agent, or Firm* — Gugliotta & Gugliotta LPA

(57) ABSTRACT

A security transport system protects valuable items through an integrated electronic-mechanical cart with automated security activation. The cart features a hardened metal security cover and a concealed pressure-sensitive handle switch that permits wheel movement when gripped. Upon handle release, the system engages non-reversible wheel brakes, activates security cameras, and alerts personnel. The cart's substantial weight and fail-secure brake system prevent unauthorized movement, while electromagnetic shielding and backup power maintain security during interference attempts. Only authorized vault personnel can access contents or override security measures. The system requires minimal initialization, featuring run-position settings and brake verification, while providing continuous protection without operator intervention during security events. This design eliminates vulnerability to armed threats by removing human decision-making from security response.

12 Claims, 5 Drawing Sheets

(56) References Cited

U.S. PATENT DOCUMENTS

| | | | | |
|---|---|---|---|---|
| 11,534,357 | B2 * | 12/2022 | Wilson | A61G 12/001 |
| 11,873,176 | B2 * | 1/2024 | Kinzler | B62B 3/002 |
| 11,970,199 | B2 * | 4/2024 | Wang | B62B 5/0053 |
| 12,030,543 | B2 * | 7/2024 | Burnett | B62B 5/0447 |
| 12,515,724 | B2 * | 1/2026 | Bibler | B25H 1/00 |
| 12,544,289 | B2 * | 2/2026 | Piovanelli | A61G 12/001 |
| 12,552,436 | B2 * | 2/2026 | Basco de Rosa Payne | B60B 33/0092 |
| 12,600,394 | B2 * | 4/2026 | Ebadian | B62B 3/004 |
| 12,617,444 | B2 * | 5/2026 | Li | B62B 3/0618 |
| 2007/0228680 | A1 * | 10/2007 | Reppert | A61G 12/001<br>280/47.35 |

* cited by examiner

SECURITY CART

CROSS-REFERENCE TO RELATED APPLICATIONS

The present invention claims the benefit of U.S. Provisional Application 63/718,629, filed on Nov. 9, 2024 and incorporated by reference as if fully rewritten herein.

BACKGROUND OF THE INVENTION

1. Field of the Invention

The present invention relates to security systems and devices for the transport of valuable items, specifically addressing the automated protection of transported assets through an integrated electronic-mechanical cart system that maintains security independent of human intervention during threat scenarios.

2. Description of the Related Art

The secure transport of high-value items represents a persistent challenge across diverse commercial, medical, and institutional settings. In casinos, large quantities of coins and cash must be transported from slot machines to vaults, often in plain view of hundreds or thousands of observers. In retail and banking operations, security personnel routinely carry cash between delivery trucks and facilities, exposed to public view. Additional sensitive items requiring secure transport include medical specimens, government documents, jewelry, bullion, antiques, valuable artwork, and forensic evidence.

Traditional transport methods typically involve security personnel manually carrying items in secure bags or basic wheeled carts. While these methods offer simplicity and operational flexibility, they present several significant vulnerabilities that have not been adequately addressed by existing solutions.

The primary weakness stems from the reliance on human resistance to threats. Security personnel carrying valuable cargo are frequently exposed to potential armed confrontation, creating situations where they must choose between personal safety and protecting assets. When faced with deadly threats, guards naturally and appropriately comply with demands to surrender valuables, typically resulting in rapid theft as perpetrators transfer items to waiting vehicles.

However, conventional security measures focus primarily on hardening transport containers through reinforced materials or complex locking mechanisms. These solutions fail to address the fundamental problem: once security personnel are compromised through threat or force, protective features can be deliberately deactivated or bypassed. Furthermore, conventional security measures focus primarily on hardening transport containers through reinforced materials or complex locking mechanisms. However, these solutions fail to address the fundamental problem: once security personnel are compromised through threat or force, protective features can be deliberately deactivated or bypassed.

The predictable nature of many transport operations, such as casino cash collections or bank deliveries, compounds these vulnerabilities by allowing potential criminals to plan and execute robberies with advance knowledge of routes, timing, and procedures.

Additional challenges in current systems include:

Maintaining robust security while allowing efficient legitimate operations;

Preventing rapid removal of valuables during the brief vulnerability window;

Ensuring prompt security response to incidents; and

Providing continuous surveillance of transported items.

Protecting personnel while securing assets

These persistent issues indicate a clear need for an innovative security solution that operates independently of human intervention during crisis situations while maintaining practical usability during normal operations.

SUMMARY OF THE INVENTION

It is thus a primary object of the present invention to provide a secure transport cart that automatically protects valuable cargo when security personnel are under duress by implementing a fail-secure electronic control system that renders the cart immobile and its contents inaccessible when operators release control of the handle.

It is a feature of the present invention to protect both the valuable cargo and the security personnel by automatically securing assets when threats occur, eliminating the possibility of surrendering valuables even under duress.

The present invention provides a secure transport cart system designed to protect valuable items like cash, jewelry, and other high-value assets during transit, particularly in environments like casinos, banks, and retail locations. The key innovation lies in its automated security mechanism that activates when security personnel are under duress. The cart features a concealed electric push button integrated into its handle. During normal operation, when guards grip the handle, they naturally depress this button, which releases the wheel brakes and allows smooth movement. However, if security personnel are forced to release the handle (such as during a robbery attempt), the system automatically activates several security measures. First, the wheel brakes immediately engage, making the cart immobile. The cart's substantial weight prevents it from being carried away. Second, the system sends an electronic alert to security personnel, notifying them of a potential robbery in progress. Additionally, integrated video cameras capture footage of any perpetrators.

This fail-secure design eliminates a critical vulnerability in traditional transport methods by removing the human element from security decisions during threats. Would-be thieves have extremely limited time (2-3 minutes) before security responds, and without proper tools, they cannot access the cart's contents. The system maintains operational simplicity during routine use while providing sophisticated protection during security incidents, requiring no special training for security personnel to operate effectively.

It is an advantage of the present invention that it automatically secures valuable cargo without requiring any active security measures from personnel under duress.

It is another advantage of the present invention that it maintains operational simplicity during normal use while providing sophisticated security features during threat scenarios.

It is an advantage of the present invention that it electronically alerts security personnel immediately when the cart's security features are activated.

It is another advantage of the present invention that it captures video evidence of potential perpetrators during security incidents.

It is an advantage of the present invention that it prevents the rapid removal of valuable cargo to a getaway vehicle by rendering the cart both immobile and inaccessible.

It is another advantage of the present invention that it requires no special training or complex procedures for security personnel to operate effectively.

It is an advantage of the present invention that it eliminates the vulnerability window during which criminals typically execute theft of valuable cargo.

It is another advantage of the present invention that it operates on a fail-secure principle, automatically defaulting to a secure state when normal operation is interrupted.

It is an advantage of the present invention that it provides continuous protection without impeding the efficiency of routine transport operations.

It is another advantage of the present invention that it protects security personnel by removing their ability to surrender valuable cargo even under threat of force.

Further features of the invention will become apparent in the course of the following description.

BRIEF DESCRIPTION OF DRAWINGS

The advantages and features of the present invention will become better understood with reference to the following more detailed description and claims taken in conjunction with the accompanying drawings, in which like elements are identified with like symbols, and in which:

DETAILED DESCRIPTION OF THE INVENTION

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Figure 1:
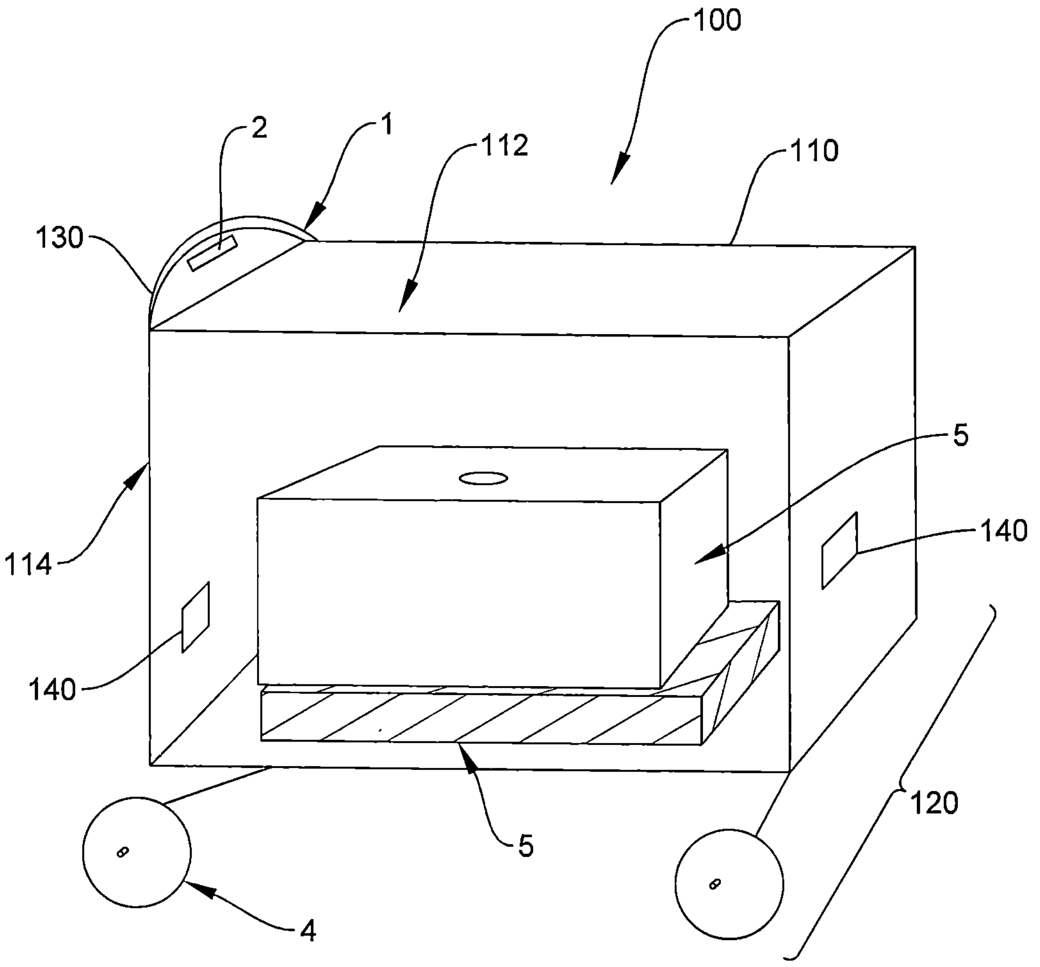
FIG. 1 is a schematic view of a security cart according to a preferred embodiment of the present invention.

Referring now to the drawings, wherein like reference numerals indicate the same parts throughout the several views, a security transport cart, generally noted as 100 is shown according to the preferred embodiment of the present invention. As shown in FIG. 1, the security transportation cart 100 is shown in its overall design, wheels, handle configuration, and general proportions establishing the basic structure and form factor of the invention. In its assembled configuration, a security transport cart 100 comprises a main body housing 110 mounted on a wheel assembly 120. A handle assembly 130 extends from the housing 110's rear portion at an ergonomic height. The housing includes a hardened metal security cover 114 that locks down over valuable contents, and an access panel 112 for loading/unloading when authorized. Integrated camera mounts 140 are positioned at strategic viewing angles.

Figure 2:
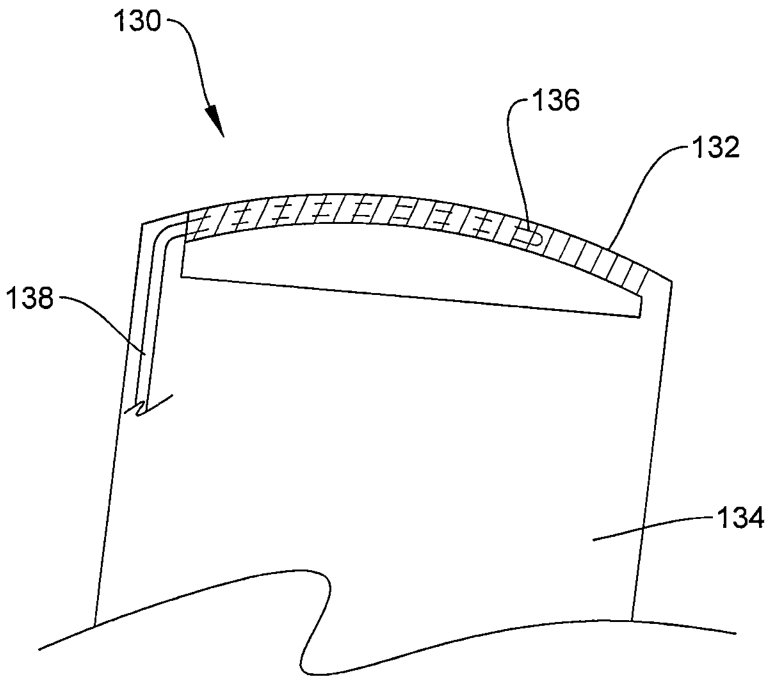
FIG. 2 is a detailed schematic view of the handle mechanism 130 for use therewith.

FIG. 2 shows the handle assembly 130, with outer grip 132 and inner support 134. A pressure-sensitive switch 136 is concealed within grip 132, positioned for natural engagement during operation while remaining hidden from observation. Electrical conduit 138 routes control wiring to the main circuit. It is essential that the switch 136 is hidden from casual observation while remaining accessible to authorized operators.

Figure 3:
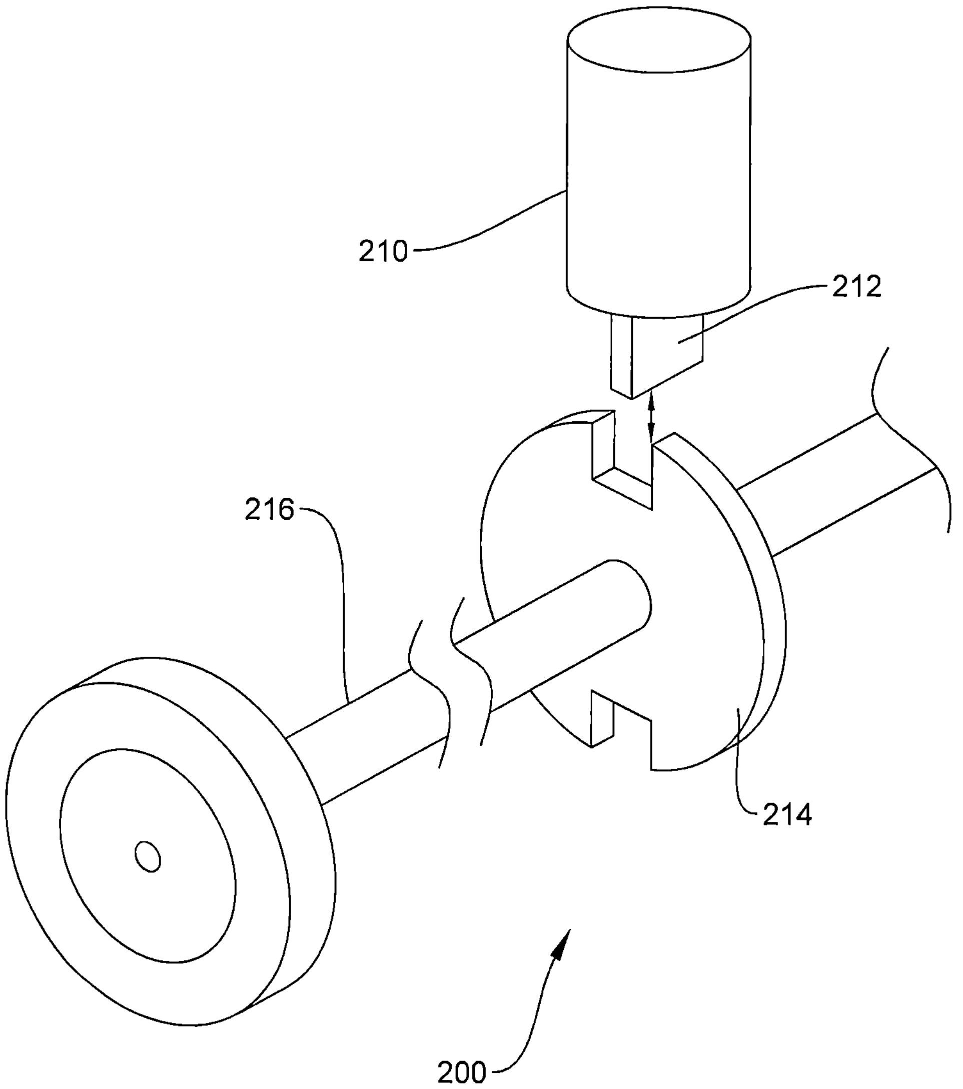
FIG. 3 is a schematic view of an example wheel brake mechanism for use therewith.

FIG. 3 illustrates an exemplary assembly for a wheel brake mechanism 200 that engages/disengages the wheels. The brake assembly uses a caliper mechanism 210 with brake lock 212 engaging a brake disc 214 on one or more wheel axle 216. The control circuit energizes solenoid 220 to retract lock 212. Spring mechanisms may be provided to automatically engage brakes upon power loss or handle release. It should be noted that the mechanism 200 is exemplary only, and as would be apparent to a person having ordinary skill in the relevant art, in light of the present invention, that various other braking assemblies, designs and configurations may be provided as functionally equivalent and, therefore, should be considered broadly to incorporate any such functional equivalent.

Figure 4:
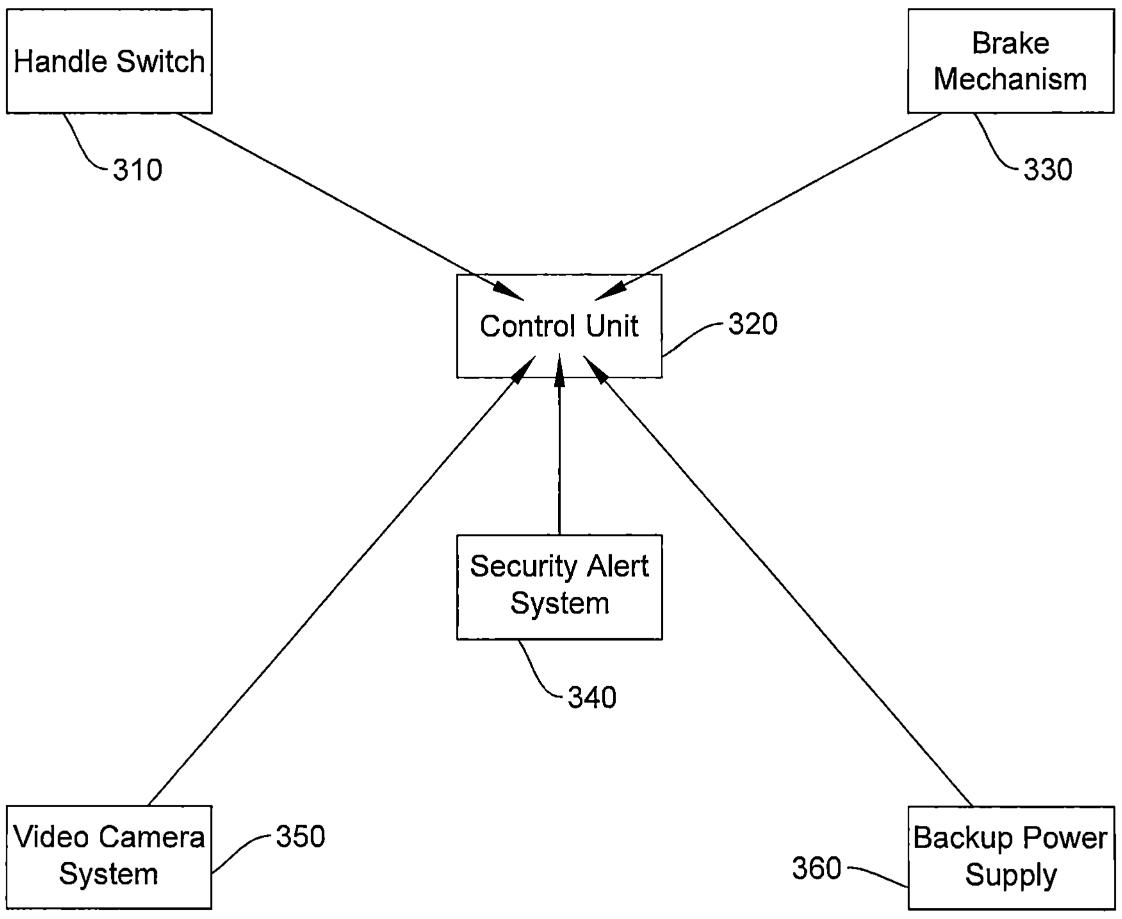
FIG. 4 is an electrical system architecture for use therewith.

FIG. 4 diagrams the electrical system 300, showing handle switch 310 connected to control unit 320. The unit manages power distribution from primary battery power supply 365 to brake solenoids 330, alert transmitter 340, and video system 350. Backup power supply 360 ensures fail secured operation during primary power interruption.

Figure 5:
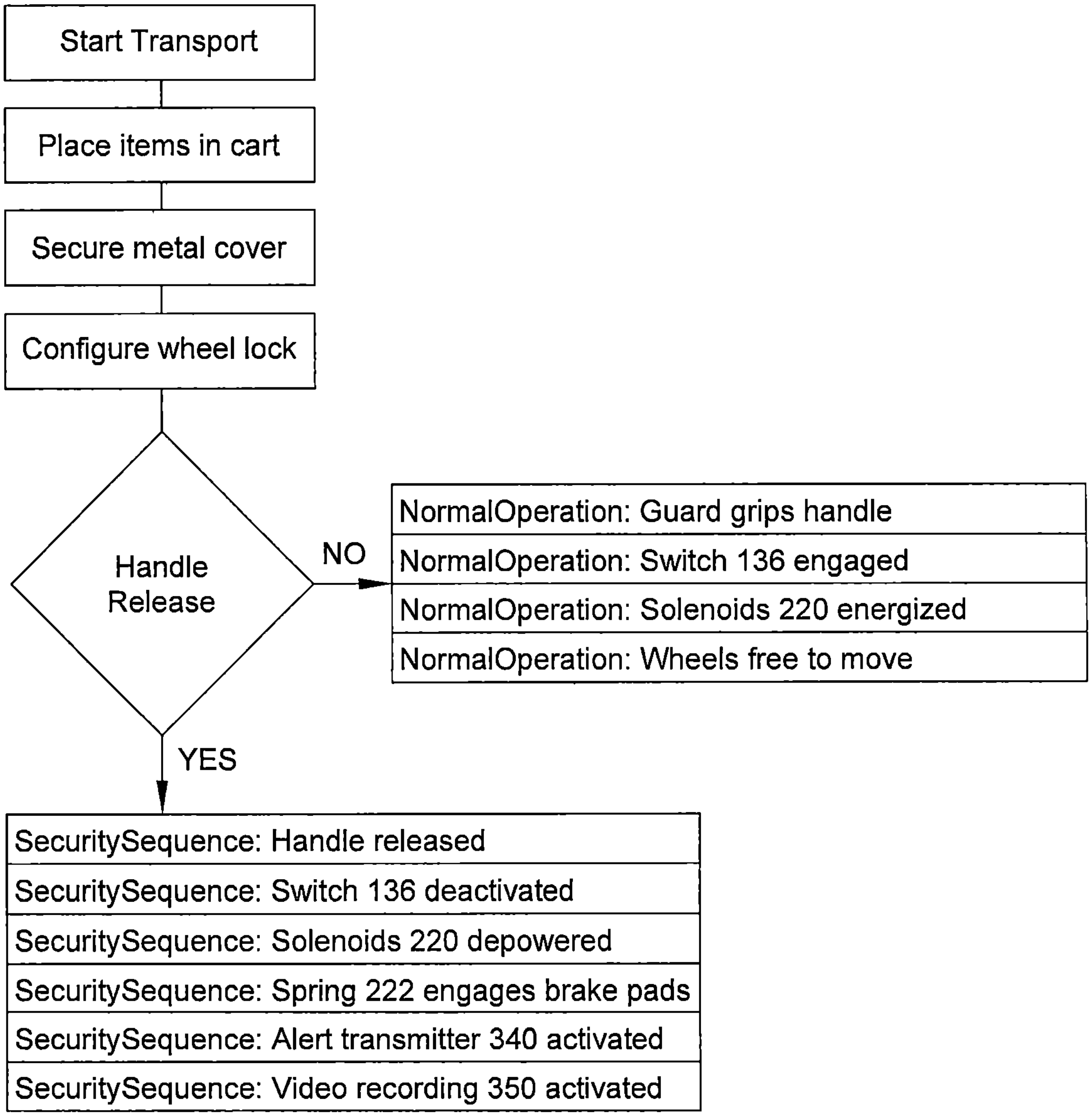
FIG. 5 is a flowchart depicting the security response sequence, from normal operation through to threat detection and security measure activation.

FIG. 5 flowcharts security response sequence from normal operation through threat detection, explaining the automatic nature of the security features and their sequential activation as described in greater detail below.

2. Operation of the Preferred Embodiment

When transport of valuables becomes necessary, the sending guard initiates the security sequence by placing items within the cart and securing the hardened metal cover with its integrated locking system. The guard then configures the wheel locking mechanism to its operational state, verifying proper brake engagement and release through the handle control system.

During standard transport operations, security personnel maintain a firm grip on handle assembly 130, which naturally engages the concealed switch 136. This action energizes the brake solenoids 220, allowing free wheel movement as long as the handle remains properly gripped. The system maintains this mobile state throughout normal transport activities.

Should operators face a threat requiring release of the handle, the security system executes an automatic protection sequence. The release of switch 136 immediately cuts power to the solenoids 220, allowing spring mechanisms 222 to forcefully engage the brake pads against their discs 214. Simultaneously, the control unit 320 activates both the alert transmitter 340 and video recording system 350. Critically, once this security sequence initiates, simply re-gripping the handle will not disengage the brakes.

The cart's substantial weight, combined with the engaged brake system, prevents both rolling and manual lifting attempts. The hardened housing 110 incorporates EMI shielding to protect its electronic systems, while the backup power supply 360 ensures continued security functionality even during power interruption attempts.

3. Access Control and Authorization

Vault guards serve as the terminal point in the secure transport chain, maintaining exclusive authorization to access the cart's contents through secure combinations and specialized keys for the cover lock systems. These authorized personnel possess the unique ability to disengage the brake lockdown state and override activated security measures when operating within secure areas. This authorization system ensures that valuables remain fully protected throughout transport until reaching their designated secure destination, where authorized vault personnel can safely retrieve the contents through proper security protocols. The system's design ensures that only individuals with proper credentials can access the protected items, maintaining security integrity from origin to final secure storage. The foregoing descriptions of specific embodiments of the present invention are presented for purposes of illustration and description.

The electronic control system can be configured for either normally-open or normally-closed switch operation while maintaining fail-secure functionality. In a normally-open configuration, power application releases the brakes, while in a normally-closed configuration, power application engages the brakes. The control circuit maintains fail-secure operation in either configuration by defaulting to the secure state (brakes engaged) upon power loss. Primary battery power supply 365 powers the electronic control system during normal operation, while backup battery power supply 360 ensures critical security functions remain active during any interruption of primary power.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Patent Application.

The invention claimed is:

1. A security transport system for protecting valuable cargo from unauthorized removal during a duress event comprising:

- a cart body configured to store items of the valuable cargo;
- a lockable security cover attached to said cart body;
- a plurality of wheels coupled to said cart body;
- a handle assembly coupled to said cart body, said handle assembly being the sole mechanism by which an operator initiates and maintains movement of said cart body during transport;
- an electronic control system comprising: a concealed pressure-sensitive switch mounted within said handle assembly, said concealed pressure-sensitive switch positioned to be continuously depressed by the operator's grip during normal transport operations while remaining hidden from external observation;
- at least one electronically-controlled brake mechanism coupled to at least one of said plurality of wheels, said brake mechanism configured to default to an engaged state upon loss of electrical power;
- a control circuit electrically connecting said pressure-sensitive switch to said electronically-controlled brake mechanism, said control circuit configured to assume a lockdown state in response to release of said concealed pressure-sensitive switch and, while in said lockdown state, to maintain said brake mechanism in an engaged state independent of any subsequent depression of said pressure-sensitive switch; and
- an access control system separate and distinct from said concealed pressure-sensitive switch and accessible only to authorized personnel, said access control system coupled to said control circuit and configured as the sole input operable to release said control circuit from said lockdown state;

wherein said brake mechanism is configured to release when said pressure-sensitive switch is initially depressed; and wherein, in response to release of said concealed pressure-sensitive switch indicative of the operator losing physical control of said handle assembly under the duress event, said control circuit assumes said lockdown state and said brake mechanism automatically engages and remains engaged such that subsequent depression of said pressure-sensitive switch, whether by said operator or by any unauthorized person, does not release said brake mechanism, release of said brake mechanism thereafter being effected only through said access control system.

2. The security transport system of claim 1, wherein said handle assembly comprises a push bar, and wherein said pressure-sensitive switch is concealed within said push bar such that neither the location nor the method of operation of said pressure-sensitive switch is discernible from external observation of said push bar.

3. The security transport system of claim 1, wherein the pressure-sensitive switch transitions between a conducting state, allowing current flow, and a non-conducting state, interrupting current flow to the brake mechanism.

4. The security transport system of claim 1, further comprising: at least one video camera mounted to said cart body;

a video recording system, wherein said control circuit is configured to actuate said video recording system to capture footage of an area surrounding said cart body upon said pressure-sensitive switch transitioning from a depressed state to a released state, said transition being processed by said control circuit as a duress event independent of any further operator input; and a security alert transmitter, wherein said control circuit is configured to actuate said security alert transmitter to transmit a duress alert to remote security personnel concurrently with said brake mechanism assuming said engaged state in said lockdown state.

5. The security transport system of claim 1, further comprising weight elements connected to said cart body and configured to cooperate with said brake mechanism in said engaged state to resist manual lifting and removal of said cart body by unauthorized persons.

6. The security transport system of claim 1, wherein said brake mechanism comprises a fail-secure brake assembly configured to automatically engage upon loss of electrical power, said fail-secure brake assembly thereby maintaining said cart body in a secured, immobile state during any interruption of power to said electronic control system.

7. The security transport system of claim 1, further comprising:

electromagnetic shielding protecting electronic components of said electronic control system from interference; and a backup power supply configured to maintain operation of said control circuit and said electronically-controlled brake mechanism during interruption of primary power.

8. The security transport system of claim 1, wherein said access control system is further configured to permit only said authorized personnel to unlock said lockable security cover, said access control system being the exclusive method by which both said lockable security cover is unlocked and said control circuit is released from said lockdown state following a duress event.

9. The security transport system of claim 1, wherein said control circuit includes a run position setting configurable during initialization.

10. The security transport system of claim 1, wherein said electronic control system is configurable in either:

a normally-open configuration wherein application of electrical power releases said brake mechanism; or a normally-closed configuration wherein application of electrical power engages said brake mechanism;

wherein both configurations maintain fail-secure operation by defaulting to an engaged brake state upon power loss.

11. The security transport system of claim 1, wherein said control circuit, while in said lockdown state, is configured such that no manipulation of said pressure-sensitive switch by an unauthorized person restores mobility of said cart body, thereby preventing an unauthorized person from defeating the system by operating said handle assembly after taking control of said cart body from said operator.

12. The security transport system of claim 1, wherein said pressure-sensitive switch is mounted within said handle assembly such that an unauthorized person observing operation of said cart body can neither visually identify said pressure-sensitive switch nor determine a method for operating said pressure-sensitive switch from external observation of said handle assembly.

* * * * *